Jan. 5, 1937.　　　L. W. LAUTERMILCH　　　2,066,785
SELF COMPUTING LEVELING ROD
Filed Feb. 9, 1934　　　2 Sheets-Sheet 2

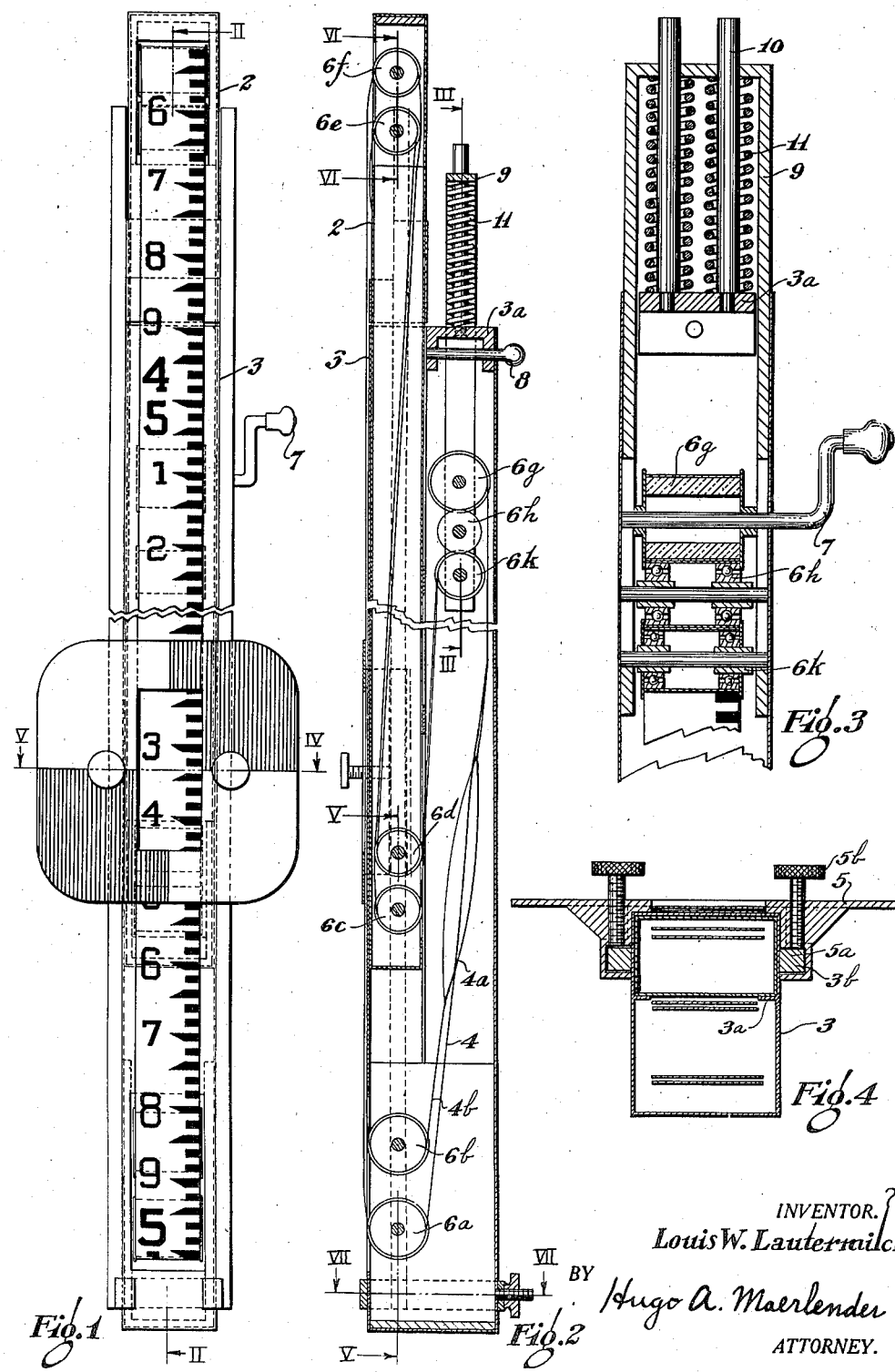

INVENTOR.
Louis W. Lautermilch.
BY Hugo A. Maerlender
ATTORNEY.

Patented Jan. 5, 1937

2,066,785

UNITED STATES PATENT OFFICE 2,066,785

SELF-COMPUTING LEVELING ROD

Louis W. Lautermilch, Cleveland, Ohio

Application February 9, 1934, Serial No. 710,548

11 Claims. (Cl. 33—74)

This invention relates to leveling rods and more particularly to self-computing leveling rods which may be used without the usual complicated calculations.

One of the leading objects of my invention is to provide a leveling rod which has a wide range of operation and is not limited to a narrow range of elevations. A further object of my invention is to provide a leveling rod which while capable of such a wide range of operation is itself small and compact and easily carried. A further object of my invention is to provide a mechanism supported by the rod which will contain and make available a long tape for use in making measurements. A still further object is to provide a leveling rod which is expansible but which when assembled is conveniently carried. Other objects will appear more fully hereinafter.

For a complete conception of my invention reference may be had to the following description and accompanying drawings in which:

Fig. 1 is a front view partly broken away showing the face of the complete leveling rod;

Fig. 2 is a longitudinal section taken on the line 2—2 of Fig. 1 showing the internal disposition of the measuring tape and bearings.

Fig. 3 is an enlarged section of a portion of the driving mechanism taken as on the line 3—3 of Figure 2;

Fig. 4 is a transverse section taken on the line 4—4 of Fig. 1, also showing the target of the rod.

Figure 5:
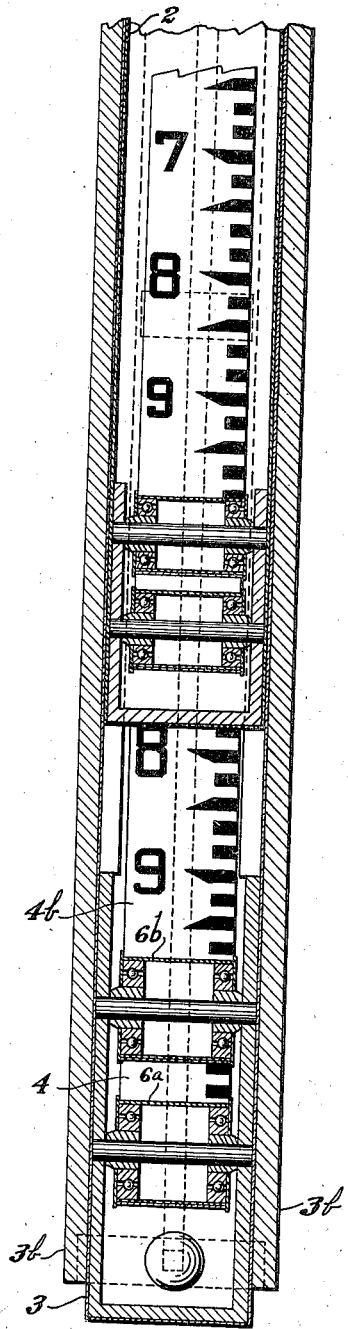
Fig. 5 illustrates in enlarged longitudinal section the portion of the rod indicated by the lines 5—5 of Fig. 2.
Figure 6:
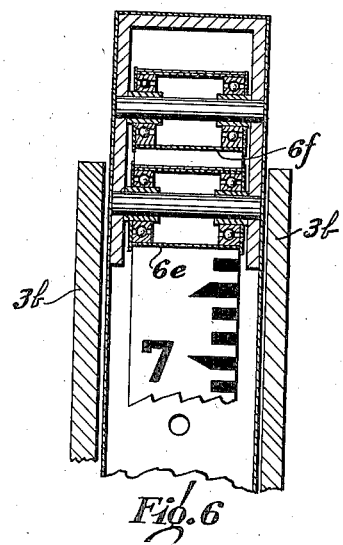
Fig. 6 is a longitudinal section of another end of the rod taken as on the line 6—6 of Fig. 2.
Figure 7:
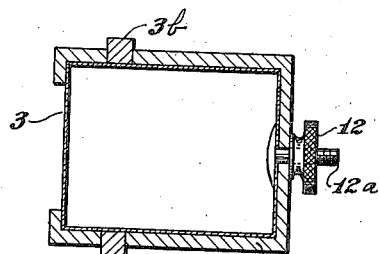
Fig. 7 is a transverse section taken on the line 7—7 of Fig. 2.

While in said drawings I have shown only the best mode in which I have contemplated embodying my invention, mechanical equivalents are within the scope thereof and are included within the terms of the appended claims.

Briefly, the invention resides in the provision of a continuous tape within expansible members and permitting a full face reading.

Referring to the same parts throughout the several views by the same reference characters, 2 and 3, represent hollow tubes substantially rectangular in shape, telescopically arranged, the one within the other. Ribs 3a are longitudinally formed on the inner sides of tube 3, and serve to guide and retain the tube 2. Tubes 2 and 3 and their respective integral appendages are preferably cast of or pressed from a light durable metal. External longitudinal rods 3b are formed on the sides of tube 3 for the purpose of forming a retaining slide for the target 5 hereinafter more fully described.

As will now be readily apparent, the tubes 2 and 3 provide space for the bearings and housing of a continuous tape 4 of cloth or metal which is wound over and around a plurality of roller bearings designated 6a, 6b, 6c, 6d, 6e, 6f, 6g, 6h and 6k. The latter are all mounted on bearings within the several tubes with their axes parallel to the face of the leveling rod, to the end that a part of the tape may be disposed exteriorly of the telescopic tubes. Bearings 6a and 6b are disposed preferably adjacent the face at one end of tube 3. Roller bearings 6g, 6h and 6k are preferably disposed at the opposite end but away from the face to the end that tube 2 may slide freely. The bearings 6d and 6c are mounted in one end of tube 2 and roller bearings 6e and 6f are mounted at the opposite end. A handle 7 is secured to the shaft of the tape bearing 6g which when rotated drives the tape at the will of the operator.

One of the features of my device is the fact that the tape is continuous and presents first one face and then the opposite face, the twisted portion 4a permitting this to be done. The exterior face of the tape 4 passes over the extreme bearings 6a and 6f. From the bearing 6a it passes over the roller 6g and makes a twist around the section 4b with which it passes over the roller 6g. Thence both sections pass around the roller bearing 6h and over the roller bearing 6k. The two sections then divide and the outer one passes around the roller 6d, while the inner one passes around the roller 6c. The two sections, however, are integral and rejoin after the inner section passes around the roller 6e. This connecting section may be disposed beneath the face of the tape which is exposed exteriorly of the tubes 2 and 3.

The tape thus is so arranged that irrespective of the fact that the tubes 2 and 3 may be in any distended position the tape length will still be adequate. Under my invention a complete 50 foot tape may be completely housed within the expansible members and a full 100 foot face reading obtained without any inconvenience.

The rear wall of the tubular member 2, is provided with a plurality of holes longitudinally disposed and spaced at intervals to receive a detent pin 8 so that the two expansible members may be locked at any convenient position since irrespective of the position of the two members the face of the leveling rod is still entirely at the disposal of the operator.

Means are also provided to keep the tape constantly taut so that the movement of the tape as the handle 7 is turned is constantly ensured. Such characteristic means are depicted in detail in Figure 3. A U-shaped member 9 is slidably mounted on the shafts 10 vertically secured in the end 3a of the member 3. The lower ends of the member 9 fit slidably within the casing 3, and support the shafts of the bearings 6h, 6k and the driving shaft 6g. Springs 11 mounted between the end 3a and the end of the U-shaped member 9 serve to keep the tape 4 taut through the medium of the shaft 6g and bearings 6h and 6k. Obviously various ways of tightening the tape may be resorted to if desired as will be readily apparent to those skilled in the art.

If desired also the bearings 6a and 6b may be replaced by a single bearing and likewise the bearings 6e and 6f may be resolved to a single unit in which case both strips of tape pass over the bearing together. Bearings 6c and 6d may also be combined. Since the tape is continuous and makes a half turn in its course, the marking of the tape illustrated in part in Figure 1 is so arranged that while there may be only fifty feet of tape a continuous procession of numerals is obtained from one to one hundred, for example. Obviously the figures may be decimated or fractioned as may be desired since such decimations do not in any way affect the resulting calculations and are only useful in obtaining accurate readings of the tape.

The target 5 previously referred to is novel in the provision of grooved brackets 5a secured on the rear of the target to slide on the rods 3b longitudinally disposed on the sides of the tubing 3. Sliding rectangular frames 5c and 5d terminate the lower and upper ends of these rods and guide the rods in their longitudinal movement. A nut 12 and bolt 12a rides in a slot in the rear of the member 3 and locks the target at any desired point. The utility of this feature resides in the fact that the operator may move the target by this method beyond his normal reach when the leveling rod is used in its expanded position. If desired also the target 5 may be released by means of the bolts 5b and set to any desired position on the supporting rods when the leveling rod is in a contracted position.

The entire apparatus is light and portable and yet at least a reading surface of 100 ft. in length is at all times available and practically any elevation within range of the rod may be directly computed without resorting to complicated calculations. It is, of course, understood that the invention is capable of various modifications without departing from the spirit of my invention.

Having thus described my invention what I claim and desire to secure by Letters Patent is:

1. A leveling rod comprising two expansible, telescopic, tubular members, pairs of pulleys mounted within one of said members at each end, a pair of pulleys in one end and a crank in the other end of the other member and a continuous tape mounted on said pulleys, and disposed internally and exteriorly of said members.

2. A leveling rod comprising two expansible, telescopic, tubular members, pairs of pulleys mounted within one of said members at each end, a pair of pulleys in one end and a crank in the other end of the other member and a continuous tape having indicia on both sides mounted on said pulleys, disposed internally and exteriorly of said members and having a half turn twist whereby the indicia of one side are made continuous with those on the other.

3. A leveling rod comprising two expansible, telescopic, tubular members, pairs of pulleys mounted within one of said members at each end, a pair of pulleys in one end and a crank in the other end of the other member, a continuous tape having indicia on both sides mounted on said pulleys, disposed internally and exteriorly of said members and having a half turn twist whereby the indicia of one side are made continuous with those on the other, and means for moving said tape.

4. A leveling rod comprising two expansible, telescopic, tubular members, pairs of pulleys mounted within one of said members at each end, a pair of pulleys in one end and a crank in the other end of the other member, a continuous tape having indicia on both sides mounted on said pulleys, disposed internally and exteriorly of said members and having a half turn twist whereby the indicia of one side are made continuous with those on the other, means for moving said tape and means for tightening said tape.

5. A leveling rod comprising two expansible, telescopic, tubular members, pairs of pulleys mounted within one of said members at each end, a pair of pulleys in one end and a crank in the other end of the other member, a continuous tape having indicia on both sides mounted on said pulleys, disposed internally and exteriorly of said members and having a half turn twist whereby the indicia of one side are made continuous with those on the other, a crank and handle for moving said tape, a spring mounted bearing for said crank and a target adjustably slidable on said members.

6. A target for a leveling rod, having longitudinal grooves within its sides, comprising a face member, rods vertically secured to said face member and slidable in said grooves, and means secured to the lower ends of said rods for clamping said rods and face member to said rod.

7. A self-computing leveling rod comprising slidable members, a continuous tape supported by said members movable therewith, having a constant length irrespective of the position of said members and characterized by a joint of one straight tape end and one reversed tape end thereby utilizing the reverse side thereof to effect a continuous reading from said tape.

8. A self-computing leveling rod comprising two slidable, telescopic members, pulley means situated within said members and a continuous tape mounted on said means, disposed interiorly and exteriorly of said members and characterized by a joint of one straight tape end and one reversed tape end thereby utilizing the reverse side thereof to effect a continuous reading from said tape.

9. A self-computing leveling rod comprising two slidable telescopic members, pulley means situated within said members and a continuous tape mounted on said means disposed interiorly and exteriorly of said members having a constant length irrespective of the position of said members and characterized by a joint of one straight tape end and one reversed tape end thereby utilizing the reverse side thereof to effect a continuous reading from said tape.

10. A leveling rod comprising two slidable telescopic members, pulley means situated within said members, a continuous tape mounted on said means, disposed interiorly and exteriorly of said members, having a constant length irrespective of the position of said members and characterized by a joint of one straight tape end and one reversed tape end thereby utilizing the reverse side thereof to effect a continuous reading from said tape and means for moving said tape.

11. A leveling rod comprising two slidable telescopic members, pulley means situated within said members, a continuous tape mounted on said means, disposed interiorly and exteriorly of said members, having a constant length irrespective of the position of said members and characterized by a twist to effect a continuous reading from both sides of said tape, means for moving said tape and means for tightening said tape substantially as illustrated and described.

LOUIS W. LAUTERMILCH.